(12) United States Patent
Thomson et al.

(10) Patent No.: US 8,958,678 B2
(45) Date of Patent: Feb. 17, 2015

(54) ELECTRO-OPTICE DEVICE COMPRISING A RIDGE WAVEGUIDE AND A PN JUNCTION AND METHOD OF MANUFACTURING SAID DEVICE

(75) Inventors: David Thomson, Ash Vale (GB);
Frederic Gardes, Guildford (GB);
Graham Reed, Godalming (GB)

(73) Assignee: University of Southampton, Southampton (GB)

( * ) Notice: Subject to any disclaimer, the term of this patent is extended or adjusted under 35 U.S.C. 154(b) by 42 days.

(21) Appl. No.: 13/574,576

(22) PCT Filed: Jan. 20, 2011

(86) PCT No.: PCT/GB2011/000060
§ 371 (c)(1),
(2), (4) Date: Oct. 15, 2012

(87) PCT Pub. No.: WO2011/089386
PCT Pub. Date: Jul. 28, 2011

(65) Prior Publication Data
US 2013/0058606 A1    Mar. 7, 2013

(30) Foreign Application Priority Data
Jan. 22, 2010 (GB) .................................. 1001064.3

(51) Int. Cl.
*G02B 6/10* (2006.01)
*G02F 1/025* (2006.01)
(Continued)

(52) U.S. Cl.
CPC ............... *G02F 1/025* (2013.01); *G02B 6/134* (2013.01); *G02F 2001/0152* (2013.01); *G02F 2201/063* (2013.01)
USPC .......................................... 385/132

(58) Field of Classification Search
CPC ........................................................ G02B 6/134
USPC ........................................................ 385/132
See application file for complete search history.

(56) References Cited

U.S. PATENT DOCUMENTS

2004/0208454 A1* 10/2004 Montgomery et al. ......... 385/50
2005/0093036 A1*  5/2005 Han ............................... 257/291
(Continued)

FOREIGN PATENT DOCUMENTS

GB      2373921 A  * 10/2002
WO   WO 0058776 A1 * 10/2000

OTHER PUBLICATIONS

M.R. Watts et al., "Low-voltage, compact, depletion-mode, silicon Mach-Zehnder modulator", IEEE Journal of Selected Topics in Quantum Electronics, vol. 16, No. 1, Jan. 22, 2010, 159.*

(Continued)

*Primary Examiner* — Charlie Peng
(74) *Attorney, Agent, or Firm* — Nadya Reingand

(57) ABSTRACT

An electro-optic device, comprising an insulating layer and a layer of light-carrying material adjacent the insulating layer. The layer of light-carrying material, such as silicon, comprises a first doped region of a first type and a second doped region of a second, different type abutting the first doped region to form a pn junction. The first doped region has a first thickness at the junction, and the second doped region has a second thickness at the junction, the first thickness being greater than the second thickness, defining a waveguide rib in the first doped region for propagating optical signals. Since the position of the junction coincides with the sidewall of the waveguide rib a self-aligned process can be used in order to simplify the fabrication process and increase yield.

9 Claims, 9 Drawing Sheets

(51) Int. Cl.
  *G02B 6/134*   (2006.01)
  *G02F 1/015*   (2006.01)

(56) References Cited

U.S. PATENT DOCUMENTS

2006/0008223  A1*  1/2006  Gunn et al. .................... 385/129
2010/0060970  A1*  3/2010  Chen ............................. 359/245
2010/0080504  A1*  4/2010  Shetrit et al. .................... 385/14

OTHER PUBLICATIONS

F.Y. Gardes et al., "High-speed modulation of a compact silicon ring resonator", Optics Express, vol. 17, Issue 24, pp. 21986-21991 Nov. (2009).*

J You, et al., "12.5 Gbps optical modulation of silicon racetrack resonator based on carrier-depletion in asymmetric p-n diode", Oct. 27, 2008 / vol. 16, No. 22 / Optics Express 18340.*

* cited by examiner

ELECTRO-OPTICE DEVICE COMPRISING A RIDGE WAVEGUIDE AND A PN JUNCTION AND METHOD OF MANUFACTURING SAID DEVICE

CROSS-REFERENCE TO RELATED APPLICATIONS

The present application is the National stage application of PCT/GB2011/000060 filed Jan. 20, 2011 with the priority date of Jan. 22, 2010.

FIELD OF THE INVENTION

The present invention relates to the field of electro-optics, and particularly to electro-optic devices comprising a waveguide rib and methods for the fabrication thereof.

BACKGROUND ART

Silicon microphotonics has generated an increasing interest in recent years. Integrating optics and electronics on the same chip would allow enhancement of integrated circuit (IC) performance. Furthermore, telecommunications could benefit from the development of low cost solutions for high-speed optical links. The realization of active photonic devices, in particular high speed optical modulators integrated in silicon-on-insulator (SOI) waveguides, is essential for the development of silicon microphotonics/nanophotonics.

Although silicon does not in normal circumstances exhibit a linear electro-optic (Pockets) effect, other mechanisms are available for modulation, including thermo-optic and plasma dispersion effects. Aside from these, further interesting methods have been reported which include using strain to introduce a Pockets effect, forming SiGe/Ge quantum wells to take advantage of the quantum-confined stark effect, and bonding III-V materials to make use of their stronger electro-optic properties. The disadvantage of these approaches is the complex or non-CMOS compatible fabrication processes involved. The thermo-optic effect in silicon is relatively, very slow and therefore has no real use for high speed applications. The plasma dispersion effect on the other hand is much more promising with most of the recent successful high-speed silicon modulators being based upon this effect, whilst using carrier injection, depletion or accumulation to cause the required changes in free-carrier concentration.

The plasma dispersion effect uses changes in the free-carrier concentration to cause modulation of the light passing through the device. The free-carrier concentration may be changed by injecting carriers into the device, depleting carriers from a region of the device or by causing an accumulation of charge carriers in a region of the device. Carrier injection is typically carried out in a PIN diode structure with the optical waveguide passing though the intrinsic region. When the diode is forward biased, carriers pass into the intrinsic region causing a change in refractive index. Carrier depletion can be based upon a PN junction diode in the waveguide. Reverse biasing the diode causes carriers to be swept out of part or all of the waveguide region, again resulting in a change in refractive index. Carrier accumulation involves the use of an insulating layer between P and N diode regions that will, when biased, cause an accumulation of free carriers on the edges of the layer, much like a capacitor. Carrier depletion and accumulation, unlike carrier injection, are not limited by the relatively long minority carrier lifetime in silicon and consequently the fastest reported devices have utilised these mechanisms.

The figures of merit for classifying optical modulators are as follows:
Electro-optic bandwidth: this indicates the high-speed cut off frequency and can be used to predict data transmission rates in the absence of an eye diagram.
Data transmission rate: this indicates the rate at which data can be transmitted, with 5 Gb/s, 10 Gb/s or 40 Gb/s normally being targeted.
Dynamic extinction ratio: this gives the difference between the modulators on and off power levels at a specified data rate. A large extinction ratio will allow for longer transmission lengths before data restoration is required.
Optical insertion loss.
DC extinction ratio: this indicates the low speed difference in on and off power levels.
$V\pi L\pi$ efficiency: since devices produce phase modulation which is later converted to intensity modulation, this describes the voltage-length product required to produce a $\pi$ radian phase shift.
Size.
Power efficiency.
Other than these quantifiable factors, however, it is also important to consider the ease of fabrication and expected tolerances in device performance caused by slight variations inherent in the fabrication processes used, as these can have a direct effect on production cost and device yield. Existing devices have improved the data transmission rate and $V\pi L\pi$ efficiency, but are not always practical for mass production due to their complex structure.

SUMMARY OF THE INVENTION

It is therefore an object of the present invention to provide an electro-optic device, such as an electro-optical modulator, that is relatively simpler and easier to produce than existing devices, but nonetheless provides strong performance in terms of the quantifiable factors listed above.

In one aspect, the present invention provides an electro-optic device, comprising an insulating layer and a layer of light-carrying material adjacent the insulating layer. The layer of light-carrying material comprises a first doped region of a first type and a second doped region of a second, different type abutting the first doped region to form a pn junction. The first doped region has a first thickness at the junction, and the second doped region has a second thickness at the junction, the first thickness being greater than the second thickness, defining a waveguide rib in the first doped region for propagating optical signals, such that the pn junction coincides with, or is aligned with, a sidewall of the waveguide rib.

In a further aspect, there is provided a method of fabricating an electro-optic device, comprising: depositing a mask over part of a layer of light-carrying material and partially etching areas of the layer not covered by the mask, to form thereby a relatively thicker waveguide rib for propagating optical signals; and doping a second region of the layer, abutting the mask, to form a second doped region of a second type. A first region, comprising at least the waveguide rib, is doped with dopants of a first, different type, such that a pn junction is formed that coincides with, or is aligned with, a sidewall of the waveguide rib.

Thus according to embodiments of the present invention a mask may be used to define a waveguide rib, and also as part of a barrier for doping a region adjacent to the waveguide rib. The fact that steps are self aligned means that the doped regions are in the required position every time. This will decrease device performance variations which in turn leads to an increase in yield.

BRIEF DESCRIPTION OF THE DRAWINGS

An embodiment of the present invention will now be described by way of example, with reference to the accompanying figures in which.

DETAILED DESCRIPTION OF THE EMBODIMENTS

As stated above, conventional silicon electro-optic devices (such as electro-optic modulators) comprise a waveguide portion through which photons are transmitted. In operation, the free carrier concentration of the waveguide portion may be adjusted in order to change Its refractive index and control the passage of light through the device. This is usually achieved via a pn or pin junction, or MOS capacitor formed across/in the waveguide. However, the design of conventional devices has been such that their fabrication is difficult to achieve in CMOS processing.

According to embodiments of the present invention, an electro-optic device comprises a layer of light-carrying semiconductor material, such as silicon. The layer has two doped regions of opposite type, with one of the doped regions comprising a thicker waveguide rib through which photons are primarily conveyed. The other doped region abuts this waveguide rib, such that the pn junction so formed coincides with a sidewall of the waveguide rib. This structure has the advantage that it allows a self-aligned fabrication process, increasing reliability and yield.

Figure 1:
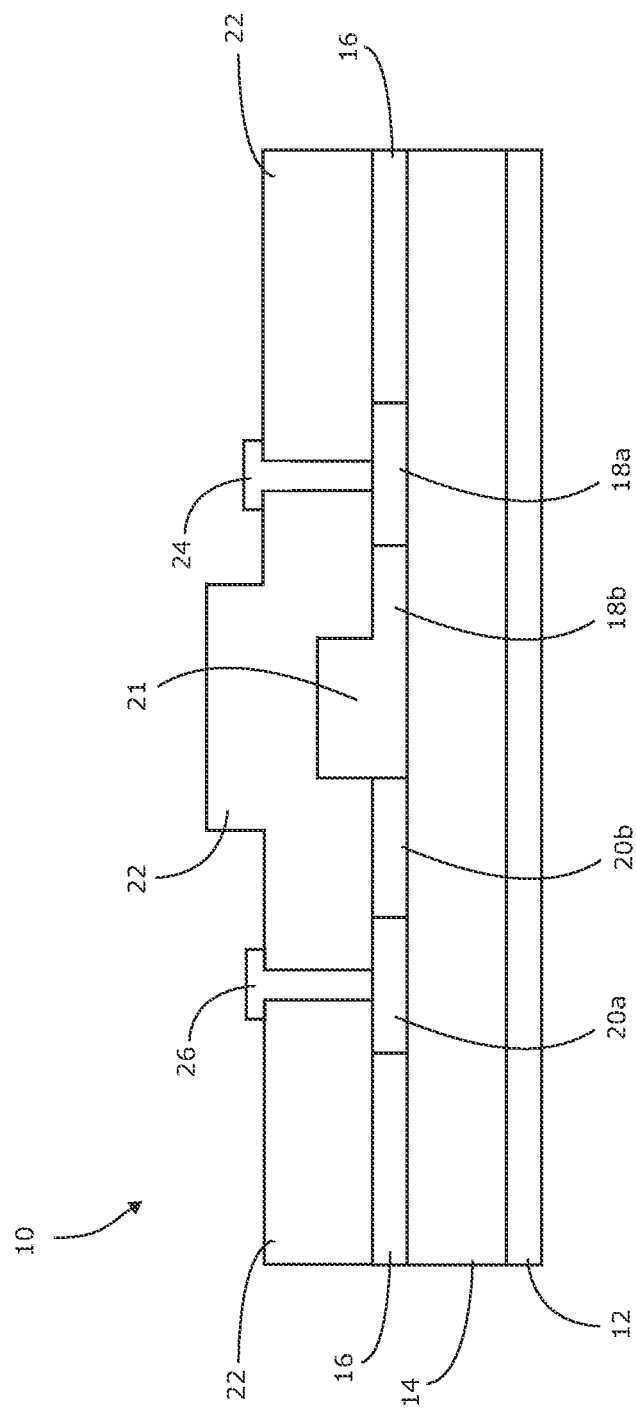
FIG. 1 shows an electro-optic device according to embodiments of the present invention.

FIG. 1 shows in cross-section an electro-optic modulator 10 according to an embodiment of the present invention (not to scale).

The modulator 10 comprises a substrate 12 and an insulating layer 14 formed thereon. In one embodiment, the substrate is fabricated from silicon and the insulating layer from silicon dioxide; the insulating layer 14 is frequently referred to in the art as a 'buried oxide' layer. However, alternative materials will be apparent to those skilled in the art, such as (but not limited to) silicon on sapphire (where the entire sapphire substrate is insulating), germanium on silicon, and silicon-germanium on insulator.

Above the insulating layer 14 is formed a layer of light-carrying material. In one embodiment, the light-carrying material is silicon and the light-carrying layer is primarily composed of intrinsic silicon. However, formed within the light-carrying layer are two regions of doped material: a p-type doped region 18 and an n-type doped region 20. Undoped regions 16 (i.e. intrinsic regions) surround the doped regions. It should be noted, however, that some of the nominally intrinsic region 16 may typically contain residual dopants and will therefore be lightly doped p-type or lightly doped n-type (typically at a concentration of $10^{15}$ cm$^{-3}$). The two doped regions 18, 20 abut each other to form a pn junction, as is well known in the art. Each region 18, 20 is further divided into two parts. The p-type region 18 comprises a first part 18a of highly doped material (as commonly denoted p+ in the literature), and a second part 18b of relatively sparsely doped material (as commonly denoted p in the literature), that is, sparsely doped relative to the highly doped region 18a. Similarly, the n-type region 20 comprises a first part 20a of highly doped material (as commonly denoted n+ in the literature), and a second part 20b of relatively sparsely doped material (as commonly denoted n in the literature), that is, sparsely doped relative to the highly doped region 20a. The pn junction between the two regions 18, 20 is formed between the relatively sparsely doped regions 18b, 20b. The p- and n-type regions 18b, 20b are typically doped at a concentration of between about $10^{16}$ and $10^{18}$ cm$^{-3}$; and the p+ and n+ regions 18a, 20a doped at a concentration of between about $10^{18}$ and $10^{20}$ cm$^{-3}$, although different concentrations may be used, and the ranges may overlap. It will be appreciated that the terms n and n+ (and similarly p and p+) are used to denote differences in the carrier concentration rather than absolute concentrations. The absolute concentrations may be tailored as desired in order to achieve a certain performance characteristic. Examples of possible p-type dopants are boron, and possible n-type dopants include phosphorus, antimony and arsenic.

The p-type region 18b comprises a relatively thicker portion 21 that acts as a waveguide rib through which photons are primarily conveyed (although in many optical modes the photons may also propagate in other regions, i.e. outside the waveguide rib). According to embodiments of the present invention, the n-type region 20b abuts the waveguide rib 21, forming the pn junction, but has a lesser thickness than the waveguide rib 21. In this way, the pn junction coincides with a sidewall of the waveguide rib 21. As will be explained in detail below, this structure lends itself to a particularly simple and reliable fabrication method.

A further insulating layer 22 is formed over the light-carrying layer and waveguide rib 21. The further insulating layer 22 may again be fabricated from silicon dioxide. Contacts 24, 26 are formed respectively with the p+ and n+ regions 18a, 20a, by passing conducting material (e.g. metallic materials) through the insulating layer 22. One of the contacts (e.g. contact 24) may be connected to a reference voltage such as ground, and the other (e.g. contact 26) connected to a signal, such that an electric potential difference can be applied to bias the pn junction as desired. It will also be apparent that, if operated in push pull with a modulator in each arm of a Mach-Zehnder interferometer for example, electrical potentials may be applied to both, or neither of the contacts 24, 26. The present invention is not limited to any particular biasing scheme.

The insulating layer 22 is not essential for the device to work, but is used as an upper cladding to both protect the waveguide rib 21 and to passivate the surface so that surface traps which would collect carriers are minimized. In the case of a modulator, it isolates the electrical contact regions 24, 26, and allows connections to the contact to be laid across the top of the insulating layer 22 without affecting other parts of the waveguide. The device would also work with an air cladding, however (i.e. without the insulating layer 22).

Figure 3A:
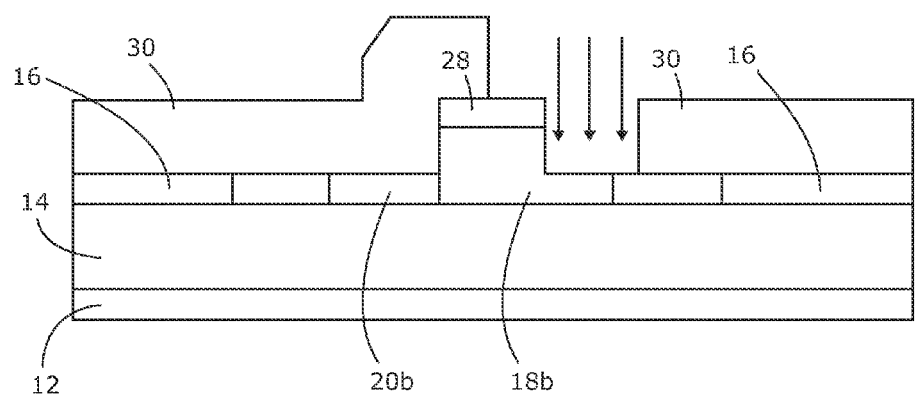
FIGS. 3a and 3b show optional steps for fabricating an electro-optic device according to further embodiments of the present invention.
Figure 3B:
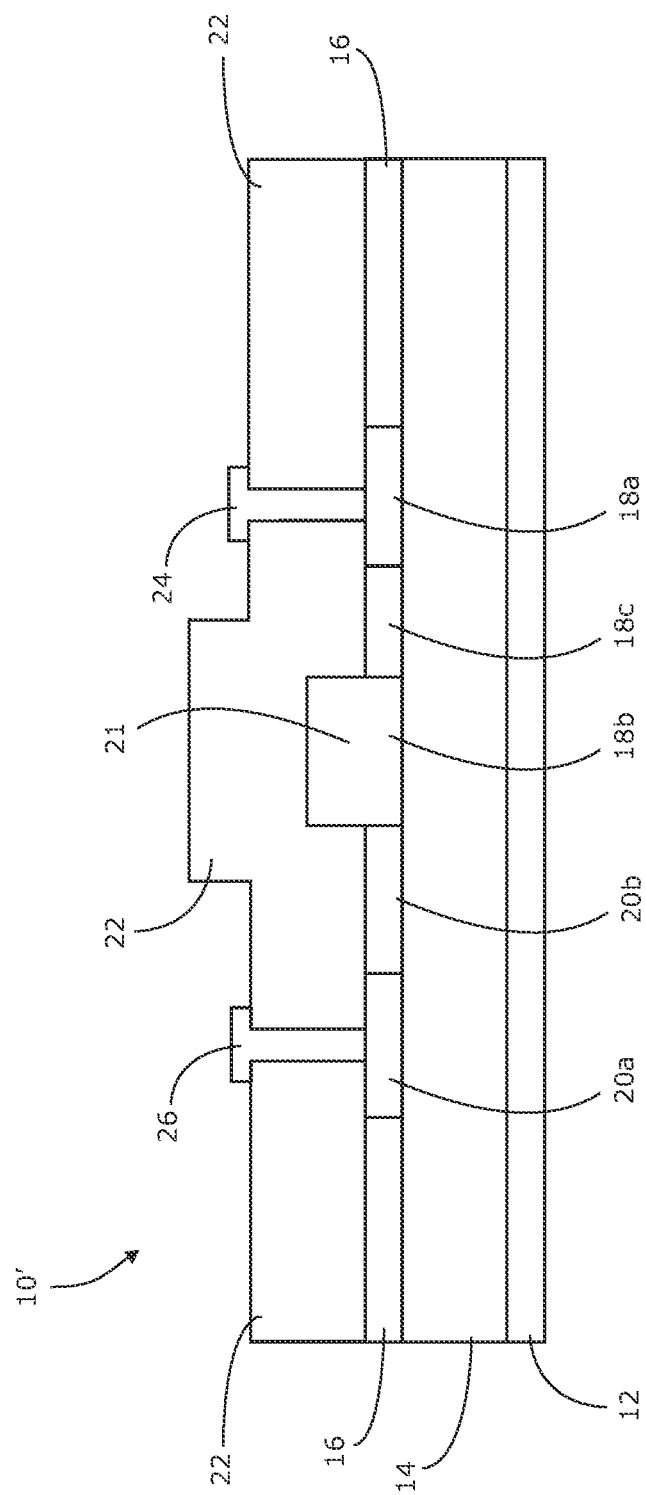
Figure 4:
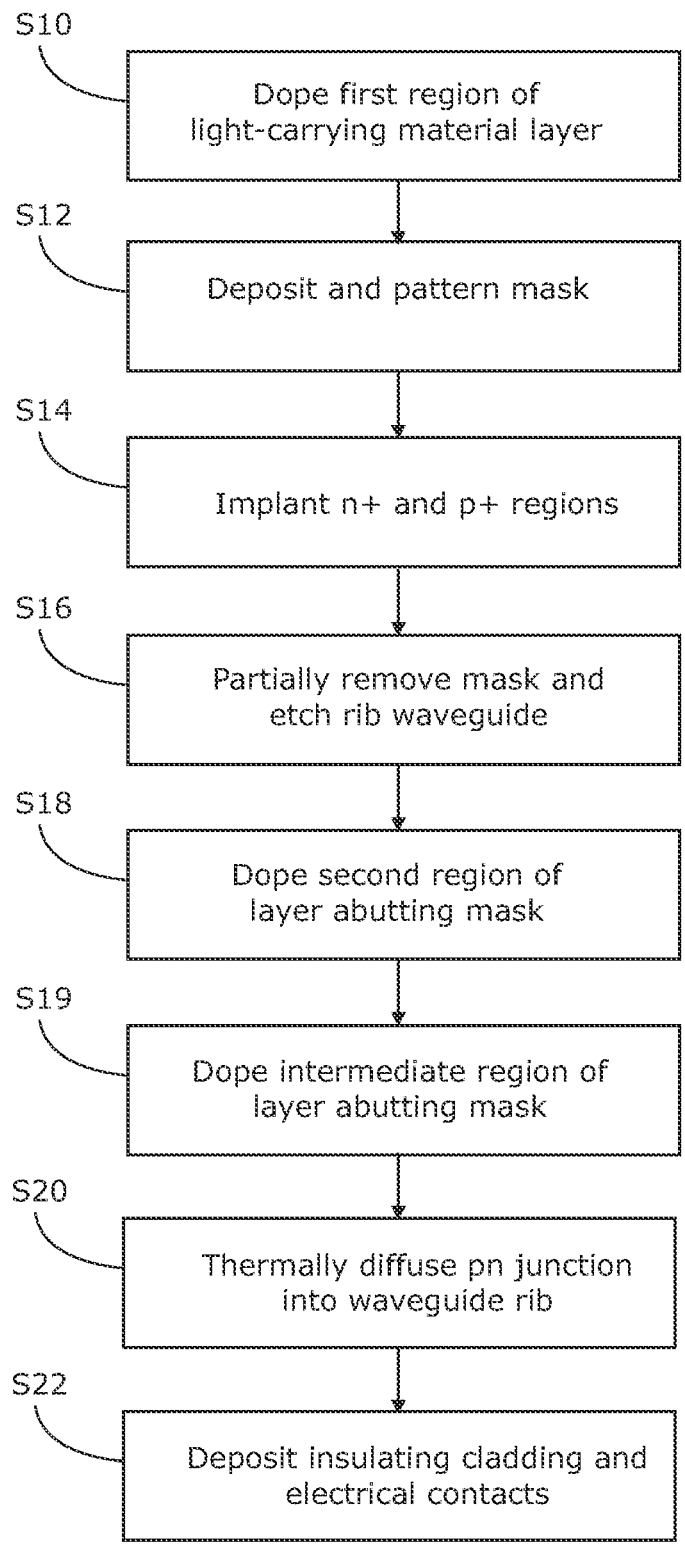
FIG. 4 is a flowchart of a method in accordance with embodiments of the present invention.

FIGS. 2a to 2h show the steps in a method of fabrication of the modulator 10 as shown in FIG. 1. FIGS. 3a and 3b show optional steps of manufacturing a modulator according to further embodiments of the present invention. FIG. 4 shows the method in the form of a flowchart.

Figure 2A:
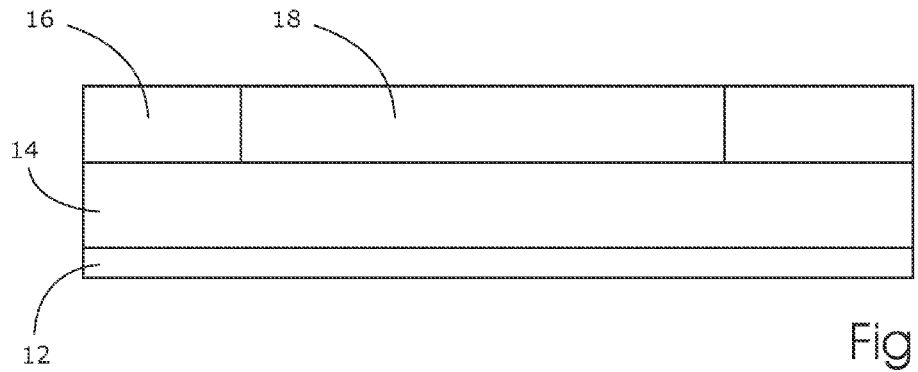
FIGS. 2a to 2h show a method of fabricating the electro-optic device as shown in FIG. 1.

FIG. 2a shows a substrate (e.g. a silicon substrate) 12 covered by a layer 14 of insulating material (e.g. silicon dioxide), with a layer of light-carrying material (e.g. silicon) on the insulator layer 14. Such a combination is commonly referred to as silicon on insulator (SOI), and is readily available. The light-carrying layer has further been doped to create a p-type doped region 18 (step S10). Such doping may be achieved in any one of a number of ways that will be familiar to those skilled in the art. For example, in one embodiment a resist may be deposited on to the light-carrying layer and patterned to uncover the area to be doped. Suitable dopants (e.g. boron) are subsequently implanted into the uncovered region at a concentration of between about $10^{16}$ and about $10^{18}$ cm$^{-3}$, and the remaining resist removed. Alternative methods include (but are not limited to): epitaxially growing the layer (providing there is a seed layer) with doping ready incorporated (in-situ doping); depositing doped amorphous layers and performing solid phase epitaxial regrowth (providing there is a seed layer); plasma-immersion; and in-diffusion of doping. An undoped region 16 surrounds the doped region 18.

Figure 2B:
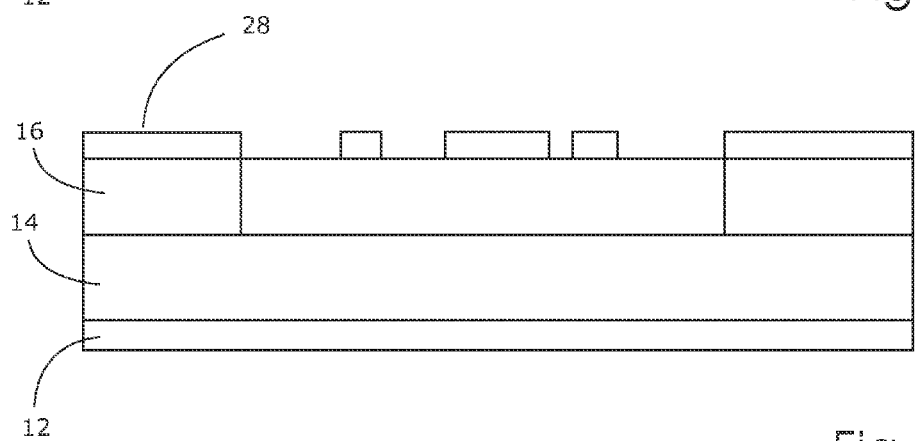

FIG. 2b shows the next stage in which a hard mask 28 has been deposited on to the layer of light-carrying material, and patterned to define at least an area that is to be the waveguide rib of the device (step S12), i.e. the part in which photons are primarily conveyed, as well as two doping windows which define the p+ and n+ regions 18a, 20a. The hard mask 28 may comprise silicon dioxide, for example.

Figure 2C:
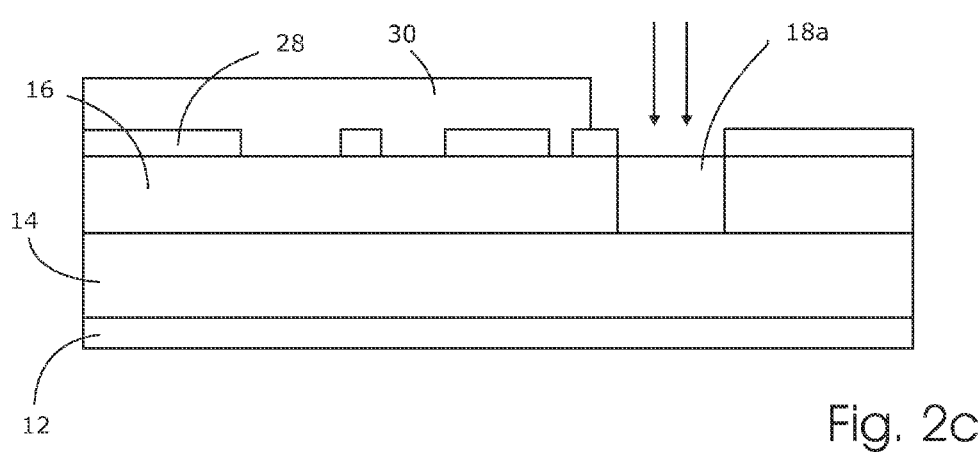

FIG. 2c shows the next stage in the process, where the p+ region 18a is formed (step S14). The p+ region 18a may be formed by masking with resist 30 all the areas not covered by the hard mask 28, except for the area that is to form the p+ region. Subsequently the area may be doped by any one of the methods defined above, using p-type dopants at a high concentration (e.g. between about $10^{18}$ and $10^{20}$ cm$^{-3}$). The hard mask 28 itself may be used to form part of the barrier to the dopants, so in this respect the doping of the p+ region 18a is a self-aligned process.

Figure 2D:
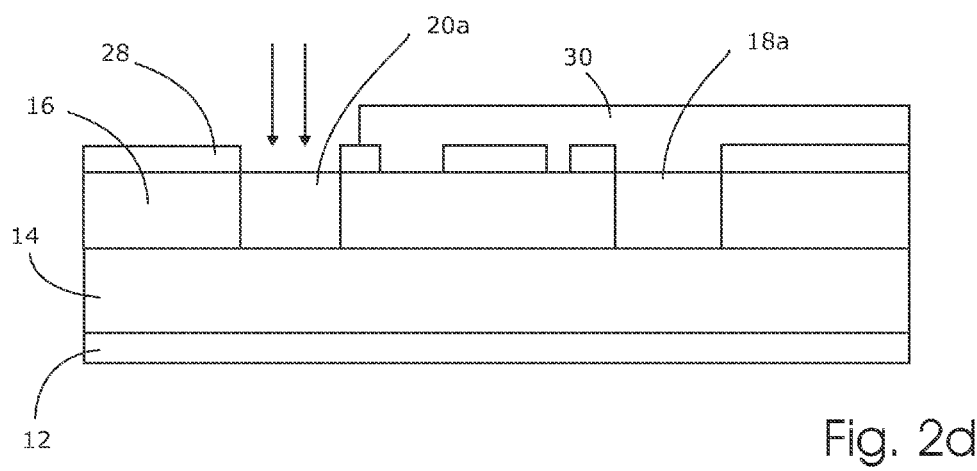

FIG. 2d shows a subsequent stage of the process, where the n+ region 20a is formed. This may be achieved by a similar process but with the n+ region left uncovered by the resist 30, and n-type dopants being used.

Figure 2E:
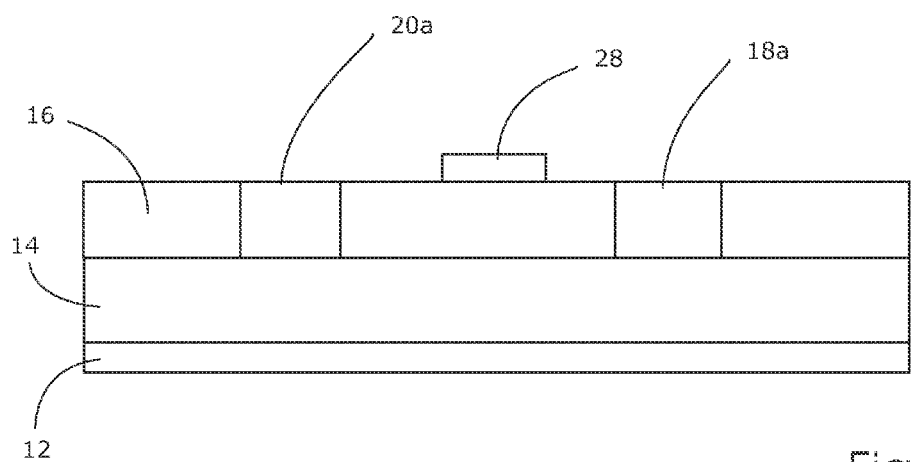

FIG. 2e shows the next stage in the process, in which all but a single part of the hard mask 28, defining the waveguide rib portion 21 of the device, has been removed (step S16 in part). This may be achieved, for example, by covering that area of the hard mask 28 with resist, stripping the uncovered parts of the hard mask, and then stripping the resist.

Figure 2F:
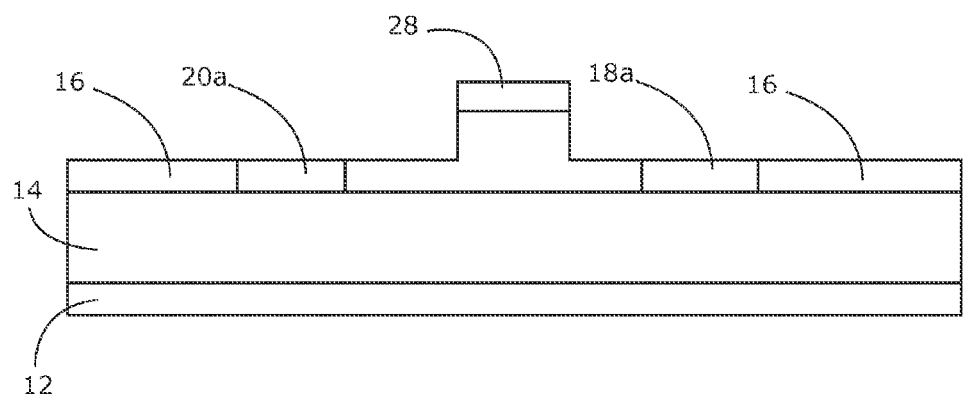

FIG. 2f shows the next stage in which the device has been subjected to an etching process, to partially etch away the layer of light-carrying material (step S16 in part) to form the waveguide rib. The mask 28 prevents the etchant from reaching the material directly below it, and so the action of the etching process is to create a relatively thin layer of light-carrying material in regions not covered by the mask 28, and a relatively thick layer in the region covered by the mask. It is this relatively thick layer that forms the waveguide rib 21 of the finished device, in which the majority of optical mode(s) propagate.

Figure 2G:
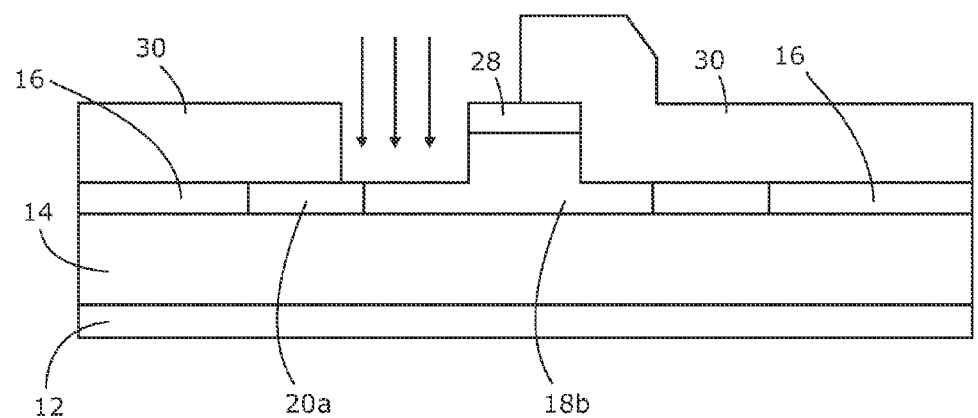

In FIG. 2g a layer of resist 30 has been deposited onto the device and then patterned (see step S18) in order to define a window abutting the waveguide rib 21 that is to be doped with an n-type dopant. The layer of resist 30 is patterned so that it is formed partially over the light-carrying layer, and partially over the hard mask 28. One boundary of the resist window is on the hard mask 28; another boundary is on the n+ region 20a. Thus the resist 30 covers areas of the light-carrying layer by itself, the hard mask 28 covers areas of the light-carrying layer by itself, and other areas are covered by their combination. Therefore the hard mask 28 and the resist 30 combine to leave an area 20 of the layer 16 which is uncovered. Doping may then take place into the area to generate the doped region 20 (see the arrows, and step S18). The energy of the doping implantation in this step is such that the dopants do not have sufficient energy to penetrate the hard mask 28. A suitable dopant in this case would be phosphorus, for example.

By leaving the hard mask 28 in place after the initial etch in step S16, the mask may be additionally used to define the area for doping, meaning that the resist 30 can be patterned (i.e. exposed) with lower tolerance levels than would otherwise be the case. That is, one edge of the resist 30 can be aligned anywhere on the hard mask 28, which is within the tolerances of most standard tools. This means that there is no critical alignment process that would result in reduced yield, and hence the fabrication process is "self aligned". Similarly, another edge of the resist may be aligned anywhere on the n+ region 20a; if the doping window includes part of the n+ region 20a, this will result in an area of even heavier doping between the nominal n and n+ regions 20b, 20a. This will not adversely affect operation of the device, however, and so the resist may be patterned with lower tolerance levels on both edges.

In one embodiment, a thermal process may optionally be used to diffuse the n-type region 20b into the waveguide rib 21, in order to increase the overlap of the propagating light with the pn junction (step S20). Alternatively, plasma-immersion doping may be used in step S18, instead of ion implantation, to dope the second region 20b of the layer abutting the mask 28. As plasma immersion is less direction-specific than ion implantation, this results in an n-type region 20b which extends slightly into the rib 21; that is, the pn junction between the n-type region 20b and the p-type region 18b is formed slightly inside the rib 21.

A thermal process is also used to electrically activate the dopants. This may be the same process as the diffusion process, or a separate process (e.g. a rapid thermal anneal at 1000° C. or higher, for a short period of 15 seconds to limit diffusion of the dopants).

Figure 2H:
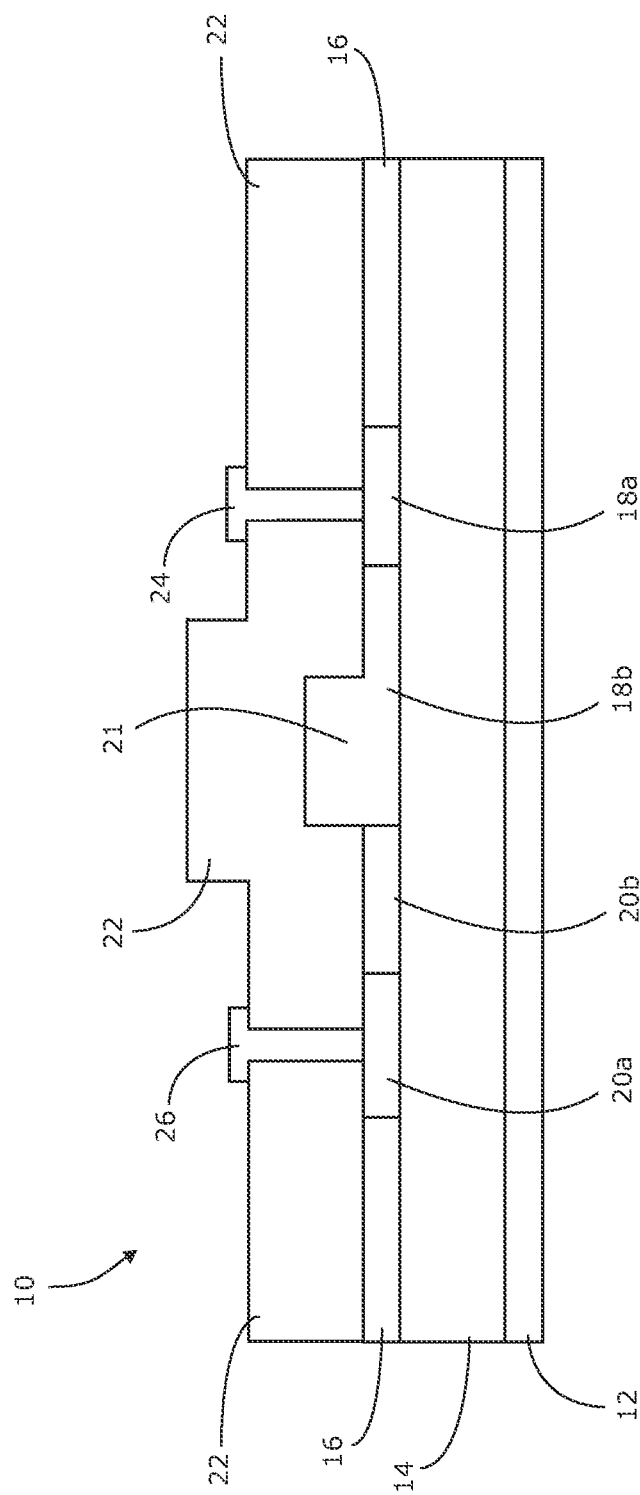

FIG. 2h shows the finished device, in which the resist 30 has been removed, and an insulating layer 22 deposited over the device (step S22). In this embodiment, the pn junction has not been diffused into the waveguide rib 21. In the illustrated embodiment, the insulating layer 22 is composed of the same material as the hard mask 28 (e.g. silicon dioxide), such that the two substantially merge to form a region of constant refractive index. However, in other embodiments different materials may be used. In addition, conducting contacts 24, 26 have been formed with the highly doped regions 18a, 20a, respectively.

In an alternative embodiment, a further doping step may be performed after step S18, in which an intermediate p-type region 18c is formed adjacent the rib 21 (step S19). FIG. 3a shows such a step, to be placed after FIG. 2g. A layer of resist 30 is deposited over the device, leaving a doping window where one edge is formed over the mask 28, and another edge is formed on the p+ region 18a. This window is then doped to achieve a p-type doping concentration which is intermediate between the concentrations of the p-type region 18b and the p+ type region 18a. This intermediate region 18c significantly reduces access resistance whilst not significantly increasing the device loss (as would normally happen if the concentration of the p-type region 18b were increased uniformly).

FIG. 3b shows the finished device 10' according to this embodiment, in which the resist 30 has been removed, and an insulating layer 22 deposited over the device. In this embodiment, the pn junction has not been diffused into the waveguide rib 21. In the illustrated embodiment, the insulating layer 22 is composed of the same material as the hard mask 28 (e.g. silicon dioxide), such that the two substantially merge to form a region of constant refractive index. However, in other embodiments different materials may be used. In addition, conducting contacts 24, 26 have been formed with the highly doped regions 18a, 20a, respectively.

Figure 5:
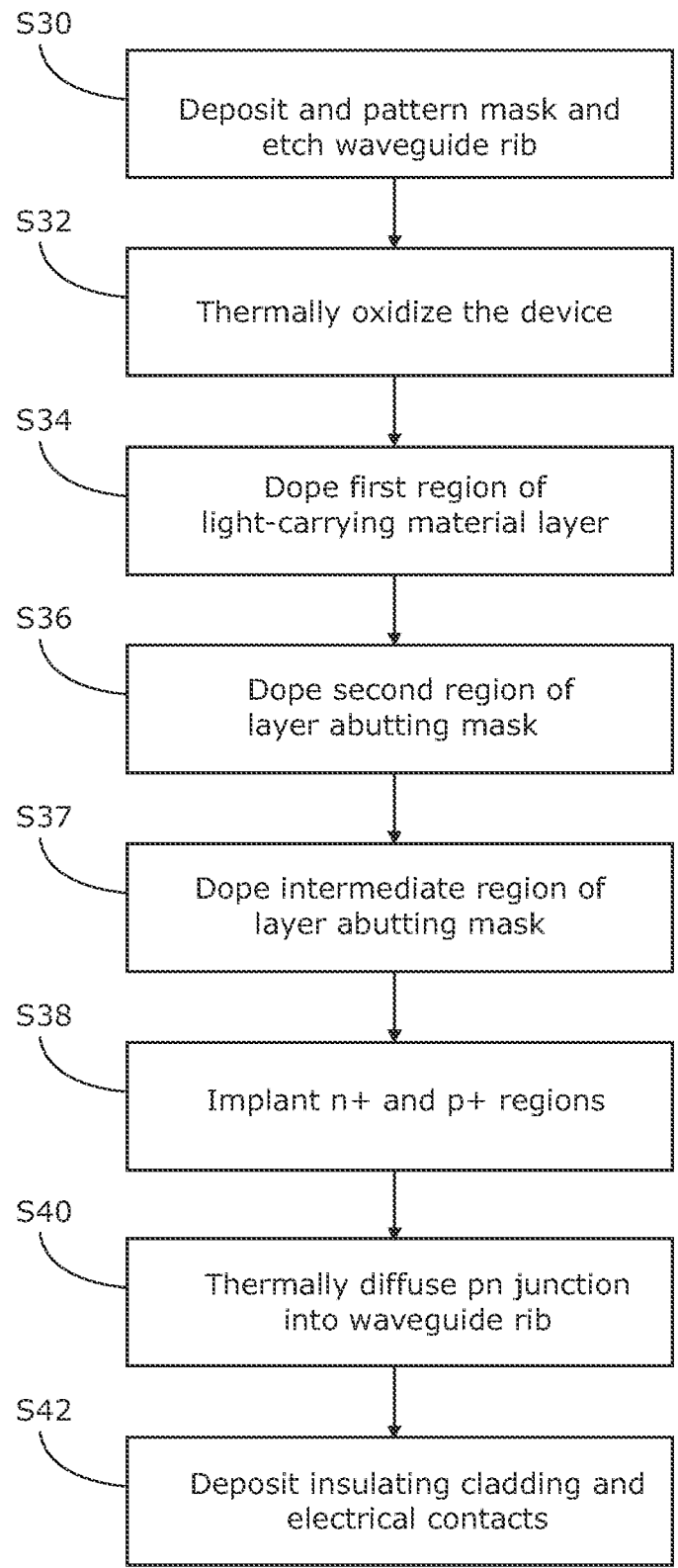
FIG. 5 is a flowchart of another method in accordance with embodiments of the present invention.

In alternative embodiments, the doping may be performed at different stages to that described above. For example, the doping may be performed after the waveguide rib 21 has been formed. One such method is shown in FIG. 5.

In this embodiment, a hard mask is deposited onto an intrinsic layer of light-carrying material and patterned in order to define the area that is to form the waveguide rib 21. The light-carrying layer is then partially etched so that the relatively thicker waveguide rib is formed (step S30).

In step S32, the device may then be thermally oxidized (i.e. heated in oxygen or steam to an elevated temperature, typically 1000° C. or higher). This process forms an oxide layer on the surface of the light-carrying layer, consuming some of the light-carrying material. However, if the surface is rough it tends to smooth it to some extent, resulting in lower scattering loss of the propagating light.

In step S34, p-type dopants are implanted with a first, relatively high energy into a first region comprising at least the waveguide rib, i.e. the portion of light-carrying material underneath the hard mask. The first region may be defined, for example, by depositing and patterning a layer of resist, which is subsequently removed. The first energy is such that the p-type dopants penetrate the hard mask, but not the layer of resist. If also doping regions to the side of the waveguide rib with p-type dopants, it may be necessary for further implantations of p-type dopants at lower energy levels. The dopants at the relatively high energy penetrate the hard mask and dope the waveguide rib 21. To the side of the rib 21, these high-energy dopants may pass through the light-carrying layer and lodge in the insulating layer 14. To dope the light-carrying layer not covered by the hard mask, therefore, a lower energy is needed.

In step S36, n-type dopants are implanted with a second, relatively low energy into a second region to the side of the waveguide rib. Again, the second region may be defined by depositing and patterning a layer of resist, which is subsequently removed. The second energy is such that the hard mask acts as a barrier, in addition to the resist; the n-type dopants do not penetrate the hard mask or the resist, and so a pn junction is formed between the first and second doped regions that coincides with a sidewall of the waveguide rib.

Optionally, in step S37, an intermediate p-type region 18c may be deposited at this stage, adjacent the rib 21 but on the other side to the n-type region 20b. The intermediate region may have a doping concentration between that of the p-type region 18b and the p+ type region 18a.

In step S38, p+ and n+ regions 18a, 20a are formed. This may be achieved for each region, for example, by depositing and patterning a layer of resist, and then implanting dopants at a relatively high concentration into the uncovered regions.

In step S40, a further thermal process may be optionally used to diffuse the n-type region 20b into the waveguide rib.

In step S42, a layer of insulating cladding is deposited, and metal contacts formed with the p+ and n+ regions 18a, 20a.

It will be apparent to those skilled in the art that various alterations can be made to the device and methods disclosed above without departing from the scope of the invention. For example, the relative positions of the n- and p-type regions may be reversed, i.e. the thick waveguide rib may be formed from n-type material, and the abutting region from p-type material.

There is thus described an electro-optic device comprising a waveguide rib, and a pn junction formed across the waveguide that coincides with a sidewall of the waveguide rib. The device structure lends itself to a self-aligned fabrication process that increases device reliability and yield.

It will of course be understood that many variations may be made to the above-described embodiment without departing from the scope of the present invention. For example, those skilled in the art will appreciate that many of the method steps set out in the application may be performed in an alternative order without departing from the scope of the present invention.

The invention claimed is:

1. A method of fabricating an electro-optic device, comprising:
    doping a first region of a layer of light-carrying material with dopant of a first type;
    depositing a mask over a part of said layer of light-carrying material and partially etching areas of the layer not covered by the mask, to form thereby a relatively thicker waveguide rib for propagating optical signals; and
    doping a second region of the layer, abutting the mask, to form a second doped region of a second, different type by using the combination of the mask used to etch the waveguide in the light guiding layer and a photoresist window to mask the implantation such that the second doped region is self-aligned with the waveguide rib.

2. The method as claimed in claim 1, further comprising: within the first and second doped regions, and to the side of the waveguide rib, forming respective regions of higher doping concentration using the combination of the waveguide etch mask and photoresist windows to enable self-alignment.

3. The method as claimed in claim 2, further comprising: forming respective electrical contacts with said regions of higher doping concentration.

4. The method as claimed in claim 1, further comprising: heating the electro-optic device such that the n-type dopant diffuses into the waveguide and as a result the pn junction is positioned within the waveguide with the self-alignment being retained.

5. The method as claimed in claim 1, wherein the first doped region is formed prior to deposition of the mask.

6. The method as claimed in claim 1, wherein the first doped region is formed after deposition of the mask.

7. The method as claimed in claim 1, wherein the second region is doped such that a pn junction is formed between the first and second regions which coincides with a side of the waveguide rib.

8. The method as claimed in claim 1, wherein the second region is doped by means of plasma immersion, such that a pn junction is formed between the first and second regions which falls within the waveguide rib.

9. An electro-optic device mask, comprising:
    at least a first mask and a second partial mask,
    wherein a first doped region formed by the first partial mask has a first thickness at a pn junction, and a second doped region formed by the second partial mask has a second thickness at the pn junction and abuts the first partial mask, the first thickness being greater than the second thickness, defining a waveguide rib in the first doped region for propagating optical signals, such that the pn junction is aligned with a sidewall of the waveguide rib, wherein the sidewall of the waveguide rib, being a part of both the first and the second partial masks, serves as an alignment element to align the first and the second partial masks in a self-aligned process in order to simplify the fabrication process and increase yield.

* * * * *